US008631388B2

(12) United States Patent
Huang et al.

(10) Patent No.: US 8,631,388 B2
(45) Date of Patent: *Jan. 14, 2014

(54) GRAPHICAL EDITOR WITH INCREMENTAL DEVELOPMENT

(75) Inventors: Jinchao Huang, Markham (CA); Thuc Nguyen, Markham (CA); Koi Chong Wong, Scarborough (CA)

(73) Assignee: International Business Machines Corporation, Armonk, NY (US)

(*) Notice: Subject to any disclaimer, the term of this patent is extended or adjusted under 35 U.S.C. 154(b) by 255 days.

This patent is subject to a terminal disclaimer.

(21) Appl. No.: 13/280,083

(22) Filed: Oct. 24, 2011

(65) Prior Publication Data

US 2012/0054717 A1    Mar. 1, 2012

Related U.S. Application Data

(63) Continuation of application No. 12/275,744, filed on Nov. 21, 2008, now Pat. No. 8,117,594, which is a continuation of application No. 11/136,628, filed on May 24, 2005, now Pat. No. 7,506,306.

(51) Int. Cl.
 *G06F 9/44* (2006.01)
(52) U.S. Cl.
 USPC .......................................... 717/113; 717/109
(58) Field of Classification Search
 USPC ........................................................ 717/113
 See application file for complete search history.

(56) References Cited

U.S. PATENT DOCUMENTS

| | | | | |
|---|---|---|---|---|
| 4,686,522 A | * | 8/1987 | Hernandez et al. | 345/160 |
| 5,600,778 A | * | 2/1997 | Swanson et al. | 715/762 |
| 5,630,131 A | * | 5/1997 | Palevich et al. | 717/108 |
| 5,963,939 A | | 10/1999 | McCann et al. | |
| 6,028,997 A | * | 2/2000 | Leymann et al. | 717/104 |
| 6,366,300 B1 | * | 4/2002 | Ohara et al. | 715/771 |
| 6,377,263 B1 | | 4/2002 | Falacara et al. | |
| 6,553,563 B2 | | 4/2003 | Ambrose et al. | |
| 6,581,203 B1 | | 6/2003 | Nguyen et al. | |
| 6,683,624 B1 | | 1/2004 | Pazel et al. | |
| 7,506,306 B2 | | 3/2009 | Huang et al. | |
| 8,117,594 B2 | | 2/2012 | Huang et al. | |
| 2002/0052941 A1 | | 5/2002 | Patterson | |
| 2002/0120784 A1 | | 8/2002 | Rajarajan et al. | |
| 2004/0093350 A1 | | 5/2004 | Alexander et al. | |
| 2004/0111711 A1 | | 6/2004 | Soroker et al. | |
| 2006/0129976 A1 | * | 6/2006 | Brand et al. | 717/109 |
| 2006/0271909 A1 | | 11/2006 | Huang et al. | |
| 2009/0070737 A1 | | 3/2009 | Huang et al. | |

OTHER PUBLICATIONS

Myers et al., "Garnet, Comprehensive Support for Graphical, Highly Interactive User Interfaces", IEEE, 1990.*

(Continued)

*Primary Examiner* — Li B Zhen
*Assistant Examiner* — Ryan Coyer
(74) *Attorney, Agent, or Firm* — Marcia L. Doubet

(57) ABSTRACT

Techniques for developing a graphical editor using an incremental development approach. Externally-stored descriptors are used to specify information on which a graphical editor engine operates to create a graphical editor. Developers can thus redefine the look and feel of the graphical editor by modifying these descriptors, effectively re-configuring the elements of visual models without changing the code of the graphical editor engine. Visual models for modeling a domain can be created and used, without first requiring the domain model to be defined.

6 Claims, 15 Drawing Sheets

(56) References Cited

OTHER PUBLICATIONS

Vlissides et al., "Unidraw: A Framework for Building Domain-Specific Graphical Editors", ACM Transactions on Information Systems, vol. 8, No. 3, Jul. 1990.*
Jinchao Huang et al., U.S. Appl. No. 11/136,628, filed May 24, 2005, Office Action, May 27, 2008, 19 pages.
Jinchao Huang et al., U.S. Appl. No. 11/136,628, filed May 24, 2005, Office Action, Aug. 15, 2008, 10 pages.
Jinchao Huang et al., U.S. Appl. No. 11/136,628, filed May 24, 2005, Notice of Allowance, Oct. 31, 2008, 7 pages.
"WebSphere Business Integration Modeler" IBM Corporation. Jan. 26, 2005 <http://www-306.ibm.com/software/integration/wbimodeler>. (1 page).
"Graphical Editing Framework" Eclipse Foundation. Jan. 28, 2005 <http://www.eclipse.org/gef/>. (1 page).
Majewski, Bo, "A Shape Diagram Editor" Eclipse Foundation. Dec. 8, 2004. Jan. 28, 2005 <http://www.eclipse.org/articles/Article-GEF-diagram-editor/shape.html>. (20 pages).
Moore, William, et al., "Eclipse Development using the Graphical Editing Framework and the Eclipse Modeling Framework" Redbook Abstract. Feb. 17, 2004. Jan. 28, 2005 <http://www.redbooks.ibm.com/abstracts/sg246302.html>. (2 pages).
"GEF Developer FAQ" Eclipse Foundation. Dec. 26, 2004. Jan. 28, 2005 <http://www.eclipse.org/gef/developer/faq.html?cvsroot=Tools_Project>. (6 pages).
"GEF Project Information" Eclipse Foundation. Jan. 28, 2005 <http://www.eclipse.org/gef/overview.html? cvsroot=Tools_Project>. (4 pages).
Hudson, Randy, "Create an Eclipse-based application using the Graphical Editing Framework" IBM Corporation. Jul. 29, 2003. Jan. 28, 2005 <http://www-128.ibm.com/developerworks/opensource/library/os-gef/>. (10 pages).
Zoio, Phil, "Building a Database Schema Diagram Editor with GEF" Eclipse Foundation. Sep. 27, 2004. Jan. 28, 2005 <http://www.eclipse.org/articles/Article-GEF-editor/gef-schema-editor.html>. (19 pages).
Myers, et al., "Garnet, Comprehensive Support for Graphical, Highly Interactive User Interfaces", IEEE 0018-9162/90/1100-007, 1990. (15 pages).
Vlissides, et al., "Unidraw: A Framework for Building Domain-Specific Graphical Editors", ACM Transactions on Information Systems, vol. 8, No. 3, Jul. 1990. (32 pages).
Jinchao Huang et al., U.S. Appl. No. 12/275,744, filed Nov. 21, 2008, Office Action, Mar. 7, 2011, 13 pages.
Jinchao Huang et al., U.S. Appl. No. 12/275,744, filed Nov. 21, 2008, Advisory Action, May 11, 2011, 3 pages.
Jinchao Huang et al., U.S. Appl. No. 12/275,744, filed Nov. 21, 2008, Notice of Allowance, Oct. 5, 2011, 9 pages.

* cited by examiner

```xml
<?xml version="1.0" encoding="UTF-8"?>
<domainModel>
<!-- A domain object is a business object of arbitary kinds. -->
```
510 `<house id="bobHouse" address="123 Main Street">`
           511

520 `  <doors>`
```
        <door id="southEntryDoor" location="front"/>
     </doors>       521
```

530 `<windows>`    531
```
        <window id="eastWindow" numPanes="3"/>
        <window id="westWindow" numPanes="2"/>
     </windows>       532
```

540 `<furniture>`       541
```
        <sofa id="livingRoomSofa" material="leather"/>
        <table id="diningTable" seats="4" material="oak"/>
        <chair id="papaChair" />         542
        <chair id="mamaChair" />
        <chair id="daughterChair" />
        <chair id="sonChair" />
     </furniture>
```

550 `<neighbor>`
```
        <house neighborId="janeHouse"/>
     </neighbor>

</house>
```

560 `<house id="janeHouse" address="127 Main Street">`
```
     <neighbor>
        <house neighborId="bobHouse"/>
     </neighbor>
  </house>

</domainModel>
```

Common Visual Meta-Model
*145*

```xml
<?xml version="1.0" encoding="UTF-8"?>
```
*711*
```xml
<visualModel xmlns:houseDescriptorModel="file:///c:/cge/sample/houseDescriptor.xmi">
```
*712*   *713*
*710* `<composition id="house1" descriptor="houseDescriptorModel:houseDescriptor">`
   `<domainObject href="domain.xmi#bobHouse" />`
*714*   *715*

*720* `<!-- "descriptor=" points to a descriptor which is specified in another file. The descriptor can be of any kinds of descriptors, and there is no tight coupling between the visual model and the descriptor. In this case, the descriptor is #houseDescriptor specified in the file "houseDescriptor.xmi". -->`

*722* `<!-- "href=" points to a domain object which is specified in another file. The domain object can be anything and there is no tight coupling between the visual model and the domain model. In this case, the domain object is #bobHouse specified in the file "domain.xmi". -->`

*730* `<compositionElements>`   *733*
*732* `<commonNode id="door1" descriptor="houseDescriptorModel:doorDescriptor">`
   `<domainObject href="domain.xmi#southEntryDoor" />` *734*
   `<!-- "href=" points to a domain object which is specified as #southEntryDoor in the file "domain.xmi". -->`
   `</commonNode>`

*736* `<commonNode id="window1" descriptor=" houseDescriptorModel:windowDescriptor" />`
   `<domainObject href="domain.xmi#eastWindow" />`
   `</commonNode>`

*740* `<commonNode id="window2" descriptor=" houseDescriptorModel:windowDescriptor" />`
   `<domainObject href="domain.xmi#westWindow" />`
   `</commonNode>`

`</compositionElements>`

*744* `<!-- The blocks <compositionElements>, <includedElements>, and <commonLink> (i.e. reference) are three types of visual relationships. There is no limitation on how many types of visual relationships can be defined. -->`

FIG. 7
(cont'd)

```
    <content>
      <inclusion>
750     <includedElements>            752
          <commonNode id="sofa1" descriptor="houseDescriptorModel:sofaDescriptor">
            <domainObject href="domain.xmi#livingRoomSofa" />
          </commonNode>       753
          <commonNode id="table1" descriptor="houseDescriptorModel:tableDescriptor">
            <domainObject href="domain.xmi#diningTable" />
          </commonNode>
          <commonNode id="chair1" descriptor="houseDescriptorModel:chairDescriptor">
            <domainObject href="domain.xmi#papaChair" />
          </commonNode>
          <commonNode id="chair2" descriptor="houseDescriptorModel:chairDescriptor">
            <domainObject href="domain.xmi#mamaChair" />
          </commonNode>
          <commonNode id="chair3" descriptor="houseDescriptorModel:chairDescriptor">
            <domainObject href="domain.xmi#daughterChair" />
          </commonNode>
          <commonNode id="chair4" descriptor="houseDescriptorModel:chairDescriptor">
            <domainObject href="domain.xmi#sonChair" />
          </commonNode>
        </includedElements>
      </inclusion>
    </content>

</composition>
                                    761
760 <composition id="house2" descriptor="houseDescriptorModel:houseDescriptor">
      <domainObject href="domain.xmi#janeHouse" />
    </composition>         762

770 <commonLink id="neighborLink1" target="house2" source="house1" descriptor="
            houseDescriptorModel:neighborDescriptor" />

</visualModel>
```

```xml
<?xml version="1.0" encoding="UTF-8"?>
<descriptorModel>
```
*811*

*810* `<compositionDescriptor id="houseDescriptor"`

*812* `editPartClassname="com.ibm.sample.houseEditPart"`

*813* `figureClassname="com.ibm.btools.rectangleFigure">`

```
<!-- in the compositionDescriptor, com.ibm.sample.houseEditPart and
     com.ibm.btools.rectangleFigure are parts. com.ibm.btools.rectangleFigure is an
     example of a pre-built part.
     As an example, the above descriptor block can be interpreted this way:
     any visual model that has been assigned a descriptor "houseDescriptor" will be
     graphically presented as rectangle, regardless of what domain object the house image
     is representing - it can be a town house, or a mansion, but will still be presented
     as a rectangle. -->
```

*815* `<compositionConstraints>`

`<compositionConstraint partId="doorDescriptor" cardinality="2">`
    `<compositionConstraint partId="windowDescriptor" cardinality="10">`
`</compositionConstraints>`

```
<!-- The composition constraints element specifies that the visual model (shown as the
     house image, in this example) has composition type relationships with visual models
     that are limited to the specified descriptors - that is, images of doors
     and windows. -->
<!-- The "cardinality" attribute on a composition constraint limits the number of objects in
     the composition type relationship. For example, the maximum number of doors
     is 2, and the maximum number of windows is 10. -->
```

*817* `<inclusionConstraints>`

`<inclusionConstraint contentId="bedDescriptor" cardinality="10"/>`
    `<inclusionConstraint contentId="chairDescriptor" cardinality="100"/>`
    `<inclusionConstraint contentId="deskDescriptor" cardinality="10"/>`
    `<inclusionConstraint contentId="sofaDescriptor" cardinality="5"/>`
    `<inclusionConstraint contentId="tableDescriptor" cardinality="5"/>`
`</inclusionConstraints>`

`<!-- target constraint -->`

*819* `<inputConstraints>`

`<LinkCardinalityConstraint targetId="houseDescriptor" cardinality="4"/>`
`</inputConstraints>`

```
<!-- The link relationships for a visual model assigned to the "houseDescriptor" are
     limited, by the sample <inputConstraints> element, to "houseDescriptor".
     The number of each that can be linked is specified using a "cardinality" attribute. -->
```

`</compositionDescriptor>`

FIG. 8
(cont'd)

*820* `<commonNodeDescriptor id="doorDescriptor"`
`editPartClassname="com.ibm.sample.doorEditPart"`
`figureClassname="com.ibm.sample.doorFigure" />`

*830* `<commonNodeDescriptor id="windowDescriptor"`
`editPartClassname="com.ibm.sample.windowEditPart"`
`figureClassname="com.ibm.sample.windowFigure" />`

*840* `<commonNodeDescriptor id="bedDescriptor"`
`editPartClassname="com.ibm.sample.bedEditPart"`
`figureClassname="com.ibm.sample.bedFigure" />`

*850* `<commonNodeDescriptor id="chairDescriptor"`
`editPartClassname="com.ibm.sample.chairEditPart"`
`figureClassname="com.ibm.sample.chairFigure" />`

*860* `<commonNodeDescriptor id="deskDescriptor"`
`editPartClassname="com.ibm.sample.deskEditPart"`
`figureClassname="com.ibm.sample.deskFigure" />`

*870* `<commonNodeDescriptor id="sofaDescriptor"`
`editPartClassname="com.ibm.sample.sofaEditPart"`
`figureClassname="com.ibm.sample.sofaFigure" />`

*880* `<commonNodeDescriptor id="tableDescriptor"`
`editPartClassname="com.ibm.sample.tableEditPart"`
`figureClassname="com.ibm.sample.tableFigure" />`

FIG. 8
(cont'd)

```
890  <commonLinkDescriptor id="neighborDescriptor"
                        editPartClassname="com.ibm.sample.linkEditPart"
                        figureClassname="com.ibm.sample.dashedLine" />
891     <permissionContraints>
            <linkConstraint sourceId="houseDescriptor" targetId="houseDescriptor"/>
        </permissionContraints>

892     <prohibitionContraints>
            <LinkConstraint sourceId="houseDescriptor" targetId="doorDescriptor"/>
            <LinkConstraint sourceId="houseDescriptor" targetId="windowDescriptor"/>
            <linkConstraint sourceId="houseDescriptor" targetId="bedDescriptor"/>
            <linkConstraint sourceId="houseDescriptor" targetId="chairDescriptor"/>
            <linkConstraint sourceId="houseDescriptor" targetId="deskDescriptor"/>
            <linkConstraint sourceId="houseDescriptor" targetId="sofaDescriptor"/>
            <linkConstraint sourceId="houseDescriptor" targetId="tableDescriptor"/>
        </prohibitionContraints>
    </commonLinkDescriptor>

</descriptorModel>
```

Visual Model Descriptor Meta-Model
900

GRAPHICAL EDITOR WITH INCREMENTAL DEVELOPMENT

BACKGROUND OF THE INVENTION

1. Field of the Invention

The present invention relates to computer programming, and deals more particularly with techniques for developing a graphical editor using an incremental development approach.

2. Description of the Related Art

Conducting business electronically using distributed networking environments such as the Internet—commonly referred to as "e-business"—is increasingly popular with business enterprises throughout the world. Providing e-business software—that is, software with which an enterprise provides its "electronic presence" in the e-business marketplace and conducts business electronically—can be a complex, time-consuming, and costly undertaking. Vendors such as the International Business Machines Corporation ("IBM"®) provide their customers with platforms and tools to assist in this process. Such platforms and tools must fulfill user's needs while being developed in a brisk-paced approach in order to remain competitive. ("IBM" is a registered trademark of the International Business Machines Corporation in the United States, other countries, or both.)

Today, tools for developing e-business software (as well other types of software) are commonly composed from many functional components. One of the main components of many tools is a graphical editor. Graphical editors present views of underlying domain models using graphical representations that include elements such as circles, boxes, lines, images, and icons. Graphical editors can be used for modeling things such as business processes, application models, or even user interface ("UI") screens. Since graphical editors mainly interact with users, a key success factor of graphical editor design is to have an appropriate usability that simplifies the user interactions and meets the user needs.

Creating a graphical editor is not an easy task, and requires considerable interaction with usability analysts. Usability analysts are people who are concerned with defining the requirements for effectiveness, efficiency, and satisfaction with which the end users can achieve tasks when using an application. When defining these requirements, usability analysts often consult people such as media designers, domain modelers, and high-privilege user groups.

There are many different approaches in designing a graphical editor. One approach focuses on how to describe the requirements. When designing according to this approach, a story board is often used to describe snapshots of visual views and the relationship of the visual elements. However, this approach can only describe a high-level relationship between visual views, and seems insufficient when trying to describe the details of each visual element.

Another, more expensive, approach is to develop a prototype. A prototype will provide a product-like, high-level perspective of the editor's usability behavior, and can be used to depict some of the high-level requirements of the graphical editor. The prototype is normally developed in a fast-paced manner in order to reduce the development cycle, cut costs, and/or avoid addressing some of the technical details that cannot be resolved at that moment. A major drawback of prototypes, however, is that they only try to present the general idea of the editor, and the developed prototype code typically cannot be reused in development of the editor itself. In addition, the usability requirements captured in the prototype stage may not accurately reflect the needs of the developed product.

In another approach, which speeds up the development cycle, a framework is provided. The framework approach can be used in development of prototypes or in actual product development cycles, and can reduce a fair amount of coding time. However, this approach still requires considerable effort to create an actual implementation. Since this approach is somewhat inflexible, it requires cautious planning and proactive process control since normally, requirements can only be accommodated in the early stage of the development cycle. Unfortunately, this does not match the nature of usability analysis, which tends to be an iterative process.

Today, developing a graphical editor of a tool normally follows the framework approach and uses the so-called "model-view-controller", or "MVC", pattern. The MVC pattern consists of three kinds of objects. The Visual ("V") object is the view representation in the graphical editor. The Model ("M") object is the domain model that the visual object represents. Finally, the Controller ("C") object defines how the user interface reacts to the user input. The MVC pattern has been applied to many different graphical editor frameworks.

As an example, the Eclipse Graphical Editing Framework ("GEF") is sometimes used as a graphical editor development framework. (Eclipse provides an open-source framework that is commonly used for development of e-business applications.) GEF provides a set of application programming interfaces ("APIs") for software developers to use and extend when developing their code. As discussed above, using this framework approach provides some benefits to reduce the development cycle; however the cycle is still not short enough. It also does not provide the flexibility to modify the editor when needed.

The above approaches are not fully effective for developing graphical editors because usability analysts do not have the capability to touch and feel the product in sufficient, representative detail in the early milestone or phase of a software development cycle. Using the current approaches, the most effective way to provide a graphical editor is to develop a full product and then allow the usability analysts to study the problems and fix those problems in the next development cycle. However, this after-the-fact approach may cause the failure of the product in the marketplace.

SUMMARY OF THE INVENTION

The present invention enables an incremental development approach, whereby a prototype-like graphical editor can be developed in the early stage of a product development cycle. By overlapping the prototyping cycle with the development cycle, the invention provides a solution that allows developers to quickly create a graphical editor. At this early stage, the graphical editor can be considered a product deliverable which supports a primary view of the (eventual) editor. Thus, the graphical editor can be released to the usability analysts for their review and comments while the tool for which the editor is being provided is still in the development cycle.

At later stages in the product development cycle, the invention enables incrementally adding new functions and behaviors to the graphical editor when new requirements are identified. The cost and duration of the development cycle can be reduced through use of the present invention, which may also greatly reduce mistakes when communicating users' requirements to the development team. As an added benefit, related users can participate in the design of tools in the early stage of development.

In terms of the invention, the visual model is the context model that the user interacts with, while the domain model captures the domain information. An instance of visual model elements displayed in the graphical editor represents a domain model element or object, or a group of domain model elements of the same type. Taking a graphical editor for an organization as an example, a person-shaped icon might be used to represent an employee in a view provided through the editor, or perhaps several of the person-shaped icons might be presented to represent several of the employees. The actual association between visual model element(s) and the corresponding domain model element(s) can be realized in a later stage in the development cycle, thereby enabling work on the organization-oriented graphical editor to begin in parallel with work on the domain model definition.

Preferred embodiments store the visual model in a structural file that is separated from a structural file containing the persistent data of the domain model elements. Preferably, XML is used for specifying these structural files, although other markup languages may be used without deviating from the scope of the invention. (Examples of structural files are discussed below with reference to FIGS. 5 and 7, which depict a sample domain model structural file and a sample visual model structural file, respectively.) The abstraction of the visual models facilitates the rapid development of the graphical editor, for the visual behaviors are a major concern of the usability analysts and the tooling developers, especially when the domain models are still going through refinement iterations.

The separation of the visual relationships from the domain object relationships helps the tooling developers focus on the tooling requirements. For example, a department has an aggregating relationship with its employees. In an organization modeling tool, a department may be presented visually as an owned element of a manager, who is one of the department employees. The visual relationship between the manager and the department illustrated in the editor does not necessarily match the relationship defined in the domain models, but satisfies the tooling requirements.

Overall, the invention can create visual models for modeling a domain, without first requiring the domain model to be defined. Externally-stored descriptors are used to specify information on which a graphical editor engine operates to create a graphical editor. The invention allows developers to redefine the look and feel of the graphical editor by modifying these descriptors, thus re-configuring the elements of visual models without changing the code of the graphical editor engine. This minimizes the development cycle and provides a rapid, incremental, intuitive approach for graphical editor development.

In one aspect, the present invention provides a method of enabling incremental development of a graphical editor, comprising steps of: providing an editor engine component that creates the graphical editor; adapting the editor engine component to process a visual model structural file, wherein the visual model structural file describes a visual model supported by the editor engine, adheres to a specified visual meta-model, identifies a visual model descriptor file, and supports graphical editing of one or more domains; and adapting the editor engine component to process the identified visual model descriptor file, wherein the identified visual model descriptor file specifies constraints on the visual model and adheres to a specified visual descriptor meta-model, and wherein the processing of the visual model descriptor file thereby configures behavior of the visual model in the graphical editor.

In another aspect, the present invention provides a system for enabling incremental development of a graphical editor, comprising: an editor engine component that creates the graphical editor; processing means in the editor engine component for processing a visual model structural file, wherein the visual model structural file describes a visual model supported by the editor engine, adheres to a specified visual meta-model, identifies a visual model descriptor file, and supports graphical editing of one or more domains; and processing means in the editor engine component for processing the identified visual model descriptor file, wherein the identified visual model descriptor file specifies constraints on the visual model and adheres to a specified visual descriptor meta-model, and wherein the processing of the visual model descriptor file thereby configures behavior of the visual model in the graphical editor.

In yet another aspect, the present invention provides a computer program product for enabling incremental development of a graphical editor, wherein the computer program product is embodied on one or more computer-readable media and comprises computer-readable instructions for: executing an editor engine component that creates the graphical editor; processing, by the editor engine component, a visual model structural file, wherein the visual model structural file describes a visual model supported by the editor engine, adheres to a specified visual meta-model, identifies a visual model descriptor file, and supports graphical editing of one or more domains; and processing, by the editor engine component, the identified visual model descriptor file, wherein the identified visual model descriptor file specifies constraints on the visual model and adheres to a specified visual descriptor meta-model, and wherein the processing of the visual model descriptor file thereby configures behavior of the visual model in the graphical editor.

The present invention will now be described with reference to the following drawings, in which like reference numbers denote the same element throughout.

BRIEF DESCRIPTION OF THE DRAWINGS

FIG. 7 provides an example of a Common Visual Model for the domain model specified in FIG. 5 and illustrated in FIG. 3;

FIG. 8 provides an example of a Visual Model Descriptor for the domain model specified in FIG. 5 and illustrated in FIG. 3;

DESCRIPTION OF PREFERRED EMBODIMENTS

Figure 1:
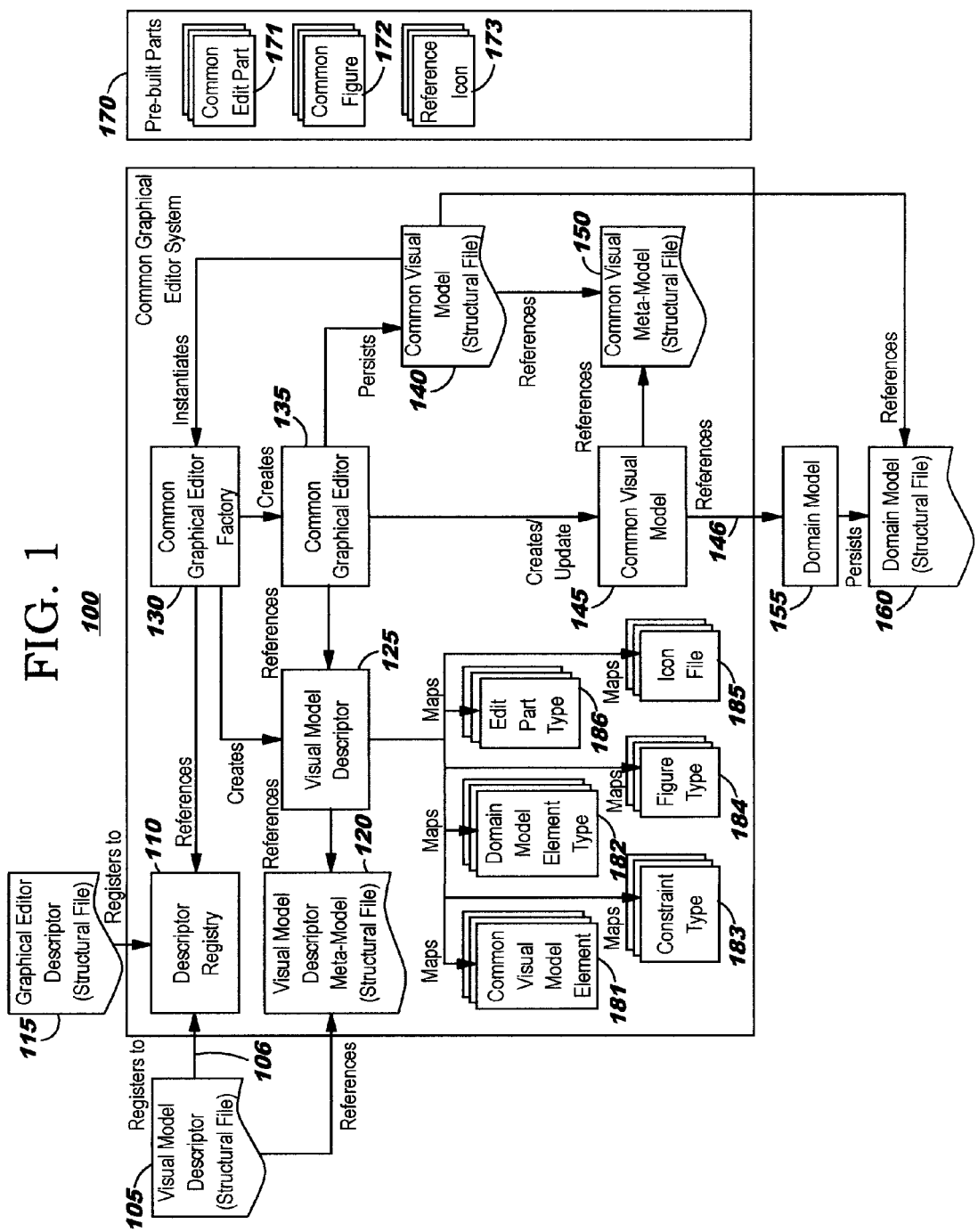
FIG. 1 shows a high-level representation of components involved in preferred embodiments of the invention.

The present invention provides incremental graphical editor development capability, using combined modularity patterns by introducing a visual composition model and a set of visual modules. FIG. 1 shows a high-level representation of components involved in preferred embodiments of the invention. As illustrated therein, the visual composition model comprises what is referred to herein as a "Common Graphical Editor System" 100. This system interfaces with supporting models 155, while the set of visual modules is preferably realized using pre-built plug-and-play parts 170.

In preferred embodiments, the invention categorizes visual composition models into two basic kinds, a node semantic model and a link semantic model, and creates a common interface (referred to herein as a "Common Visual Model", illustrated at 145 in FIG. 1) which defines the common behavior of all the visual composition models. "Semantic models", as that term is used herein, describe the meanings of a particular model, but not the visual representation of the model. Objects that must coexist with exactly two other objects are abstracted as link semantic model elements. Other objects are captured as node semantic model elements. For example, a person can be imagined as having the node semantic because the person can stand alone during modeling, whereas the parental relationship between two persons can be imagined as having the link semantic. However, the visual representations of persons and of relationships between persons can be very different. Persons (or "person nodes") might each be visually represented as independent boxes on the UI, for example, while the parental relationship might be visually represented by a line with an arrowhead pointing from the parent toward the child, or perhaps as nested boxes where, for example, a box for the child sits inside a box for the parent on the UI.

The visual depiction of a link may have a number of different forms, depending on factors such as the underlying model and the decisions of the usability analysts. As examples, a link may be shown by a line or arc, or as in the parental example discussed above, by the graphical position or composition between node depictions.

To fully capture the visual composition behaviors, the invention also categorizes the relationships among nodes. In preferred embodiments, three types of categorization are used: composition ownership, content ownership, and reference. For example, when modeling a house in a graphical editor, the house may have composition elements such as windows, doors, walls, roofs, etc.; may have content elements such as the people living in the house, furniture, paintings on the walls, etc.; and may have reference relationships with neighboring houses. Nodes that can have composition elements are furthered categorized as composition nodes.

Nodes and links can have many different graphical representations and composition behaviors. They can also represent different domain model elements. Referring again to the graphical editor for an organization, a node can represent an employee of the company. The graphical representation of an employee can be a figure of a circle or box, or a human being image or icon. A link between two employees can represent the management relationship. The graphical representation of the link can be a solid link with an arrow pointing to the employee who is being managed or pointing to the manager to whom an employee reports. Using the same example, a container node could be used to represent a department. The composition elements of the container, which are the employee nodes connected to the department node, represent the employees who work for the department. In terms of graphical editing, when a department is moved (relocated), the employees and the management relationships are also moved at the same time. This indicates that the visual composition behavior of the common visual model reflects the actual composition behavior of an organization.

In preferred embodiments, the invention uses optional references to detach visual models from domain models. (See, for example, 146 in FIG. 1, where this is illustrated.) This approach offers several benefits which are not available with the conventional approach to loose coupling of presentation data and domain data, including:

(1) a visual model can be created in the early stage of a product development cycle, without awaiting knowledge of the domain model for that product. In fact, a visual model can be created without a domain model. The association of the domain model with the visual model can then be deferred, and performed at a later stage (for example, after the domain model design is finalized). This enables the parallel development of the graphical editor and the domain model(s); and (2) the reuse of a visual model for different types of domain models, the independence of the visual tooling, and the conceptual assistance to domain model design (e.g., whereby usability analysis results obtained with a visual model can be fed back as refinements for the domain model design).

Preferred embodiments of the invention isolate the visualization data from domain data so that a small set of visual models can represent a virtually unlimited number of different kinds of domain objects. The visual model can be externalized (or persisted) in a separate structural file. This allows a particular domain model to have different visual models for targeting different usages, if desired. That is, in addition to using one visual model for multiple domain models, a particular domain model may be associated with more than one visual model.

In preferred embodiments, the invention uses the descriptor mechanism (i.e., a set of externalized specifications that are read and processed) that allows developers to define and configure the properties of the visual elements in the graphical editor. For example, one can define the basic shapes of a visual element, the composition behaviors, and the relationships with other visual elements. One or more of these properties can be changed, if necessary, by modifying the appropriate descriptor information. Developers are also able to define the types of the domain model elements that will be associated with the visual elements. With reference to the person and parent example discussed earlier, a developer might therefore create a descriptor specifying that person nodes are to be represented using graphical boxes; that persons can be related by a parental relationship; and that person nodes can be therefore be graphically composed in certain ways to indicate this relationship (such as by nesting the related box shapes). See also FIG. 8, discussed below, where a sample descriptor for a visual model is provided.

In order to enable a fast-paced development cycle as well as enable incrementally adding new behaviors for the modeled elements, preferred embodiments of the invention support use of plug-and-play parts (as noted earlier with reference to 170 in FIG. 1). Parts are preferably deployed as modules that can be used when creating editors. For example, a box shape may be provided as a pre-built part, where this box shape can be used as a graphical representation of a person node. Or as one alternative, a person node might be represented using a pre-built part that depicts an iconic representation of a person's head. Preferred embodiments also provide a framework for developers to create (or extend) parts when none of the pre-built parts are appropriate, and whereby one or more classes are provided for working with the pre-built parts. As a result, developers are able to create a prototype-like graphical editor immediately, leveraging these pre-built parts, without the need to build parts from scratch. The developers can then spend time to provide more details for each individual part as needed.

Together, the deferred association of a visual model instance with a domain object and the configuration of visual model behaviors through externalized descriptor data, as discussed above, provide the capability of developing graphical editing tools incrementally and intuitively without awaiting full prototyping cycles.

Figure 2:
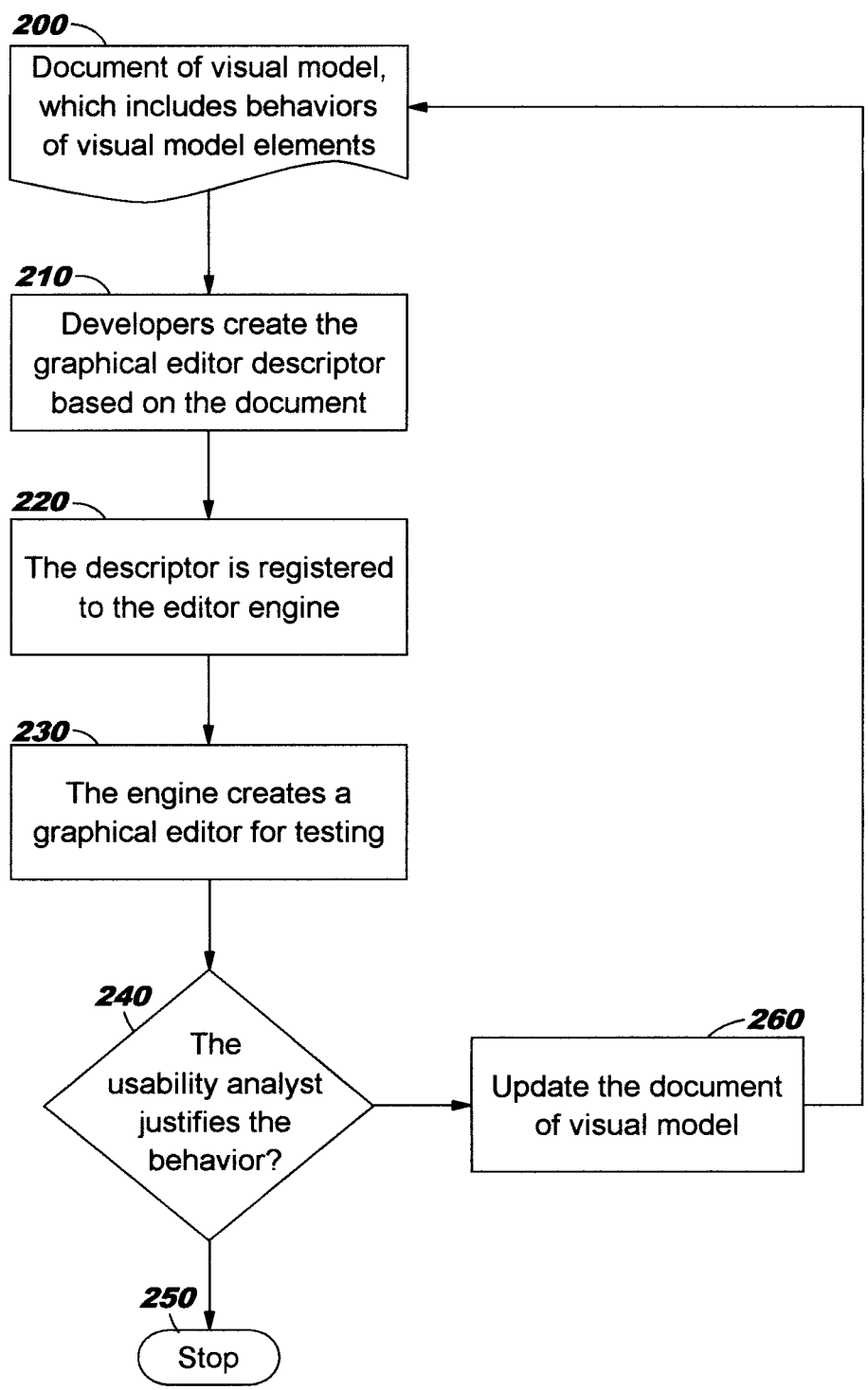
FIG. 2 provides a flowchart illustrating how the present invention may be used for creating graphical editors.

By using the invention, developers are able to create a graphical editor quickly. The editor can then be passed to the usability analysts to study whether the existing product requirements are addressed properly, and/or whether there are additional requirements that have not been identified. The recommendations from the usability analysts can then be fed back to the development team to incorporate into the next iteration. This development process is illustrated in FIG. 2, as will now be discussed.

Initially, a document of the visual model, including behaviors of the visual model elements, is produced (Block 200). Developers then create a graphical editor descriptor based on this document (Block 210). (Refer also to the description of FIG. 8, below, where a sample descriptor for a visual model is presented.) In preferred embodiments, this descriptor is registered with the editor engine (Block 220). See also FIG. 1, where descriptor 105 is registered 106 to registry 110.

At Block 230, the editor engine then creates a graphical editor which may be used, for example, for testing or other analysis. Block 240 represents a decision as to whether the usability analysts have justified the behavior as presented. If so, then the process shown in FIG. 2 ends (Block 250). Otherwise, the document of the visual model is updated (Block 260), which may include revisions suggested by the usability analysts, and control returns to Block 200 where this revised document is used as input for another iteration.

As was noted earlier with reference to FIG. 1, the mechanism of the invention is conceptually divided into two pieces: a set of pre-built parts and a common graphical editor system. Each of these will now be described in more detail.

The set of pre-built parts was briefly discussed above with reference to 170 of FIG. 1. In preferred embodiments, these pre-built parts include a set of common edit parts 171, a set of common FIGS. 172, and a set of sample or reference icons 173. Providing these pre-built parts enables creating a prototype-like graphical editor very quickly, whereby graphical representations can be created from the provided parts without spending too much time on developing parts from the ground up.

The common edit parts 171 are preferably used to describe behaviors of visual elements. An edit part for a line, as one example, is preferably provided that allows a user to drag the end of the line and thus extend the line. Similarly, an edit part for a box is preferably provided that enables the user to resize the box by dragging a line (i.e., side) of the box. Common edit parts may also be provided for operating on representations of nodes, links, containers, content, labels, and so forth. The common figures 172 preferably provide graphical representations such as boxes (i.e., rectangles and/or squares), circles, ovals, lines, arrows, etc., which can be used to visually represent a semantic model. The reference icons 173 may also be used to visually represent a semantic model, as well as to further categorize the type of figure depicted. (As discussed briefly above, a "person" icon might be provided so that users can depict people using a representation that is more natural than a figure such as a box or circle.)

The components of the Common Graphical Editor System (shown generally at 100 in FIG. 1) of preferred embodiments comprise a Descriptor Registry 110, Visual Model Descriptor 125, Common Graphical Editor Factory 130, Common Graphical Editor 135, and Common Visual Model 145. A sample domain model (representing houses) that will be used in describing preferred embodiments will now be introduced, after which the components shown in FIG. 1 will be described in more detail.

Figure 3:
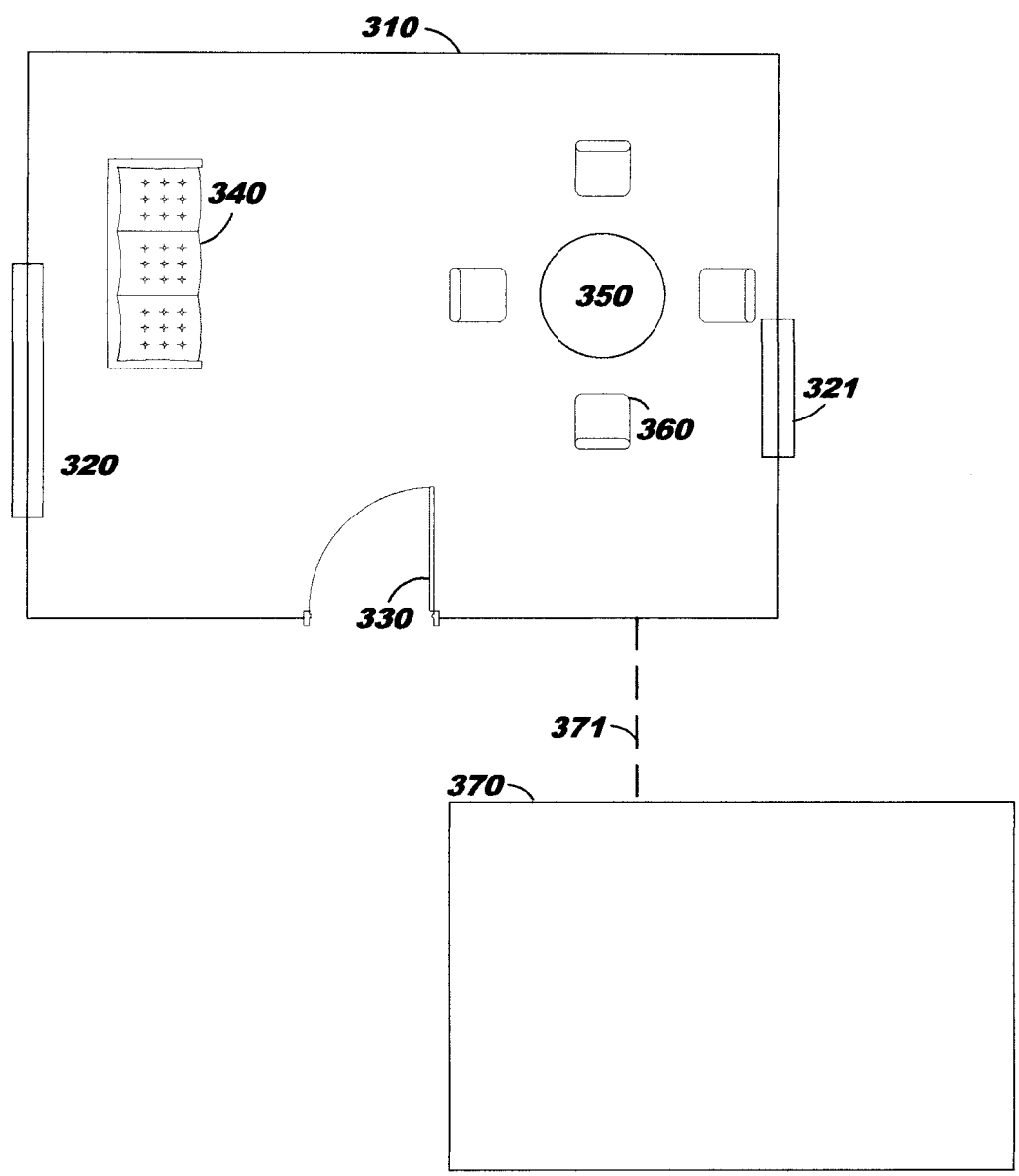
FIG. 3 presents a visual representation of a sample domain model (representing houses) that is used in describing preferred embodiments.

FIG. 3 presents a visual representation 300 of a domain model representing houses. (This domain model is used herein, by way of illustration only, in further describing preferred embodiments.) As shown therein, a house object from the domain model is visually represented as a box 310. This sample house includes two windows 320, 321 and one door 330. This sample house is furnished with a sofa 340, a table 350, and four chairs 360. This house 310 is also depicted as referencing 371 a neighbor's house 370.

Figure 4:
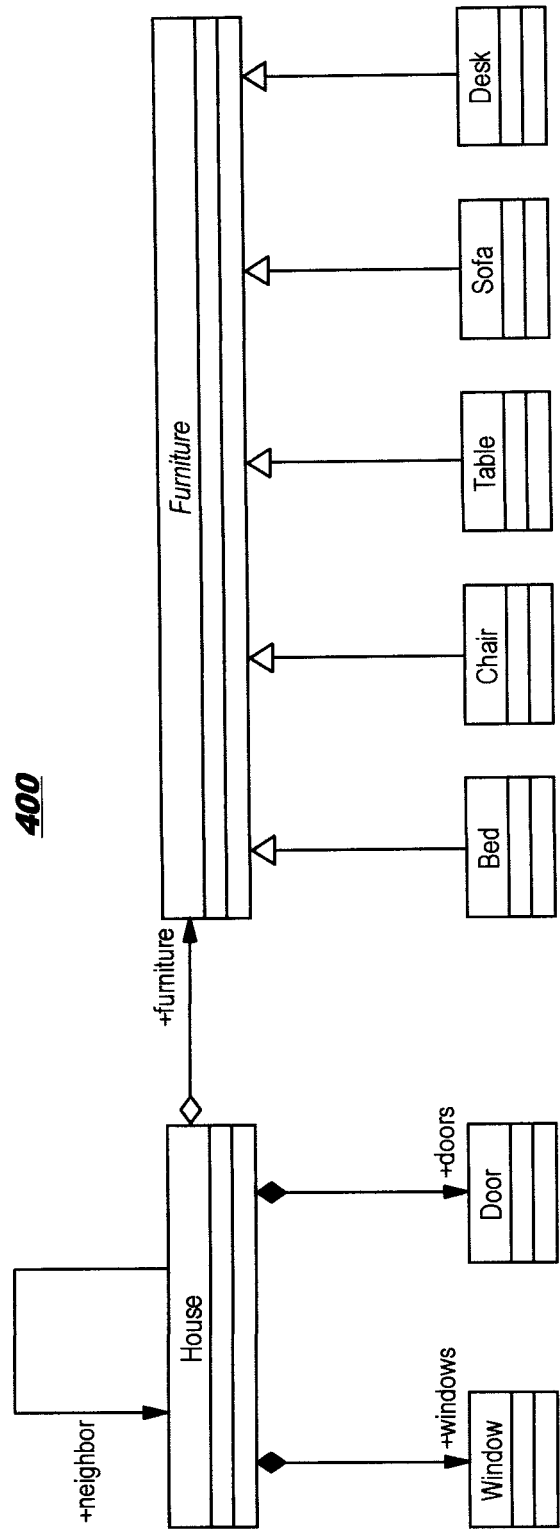
FIG. 4 provides a sample meta-model (using Unified Modeling Language, or "UML", notation) for domain objects in the domain illustrated by FIG. 3, and FIG. 5 provides a sample domain object specification according to this meta-model, where this specification is encoded in the Extensible Markup Language ("XML")

FIG. 4 provides a sample meta-model 400 for this domain object representation 300, and FIG. 5 provides an XML document 500 that specifies a sample domain object specification according to this meta-model 400. As shown by these examples, a <house> element 510 identifies this particular domain object as "bobHouse" 511 (i.e., "Bob's house", in this example); a <doors> element 520 indicates that Bob's house has a door identified as "southEntryDoor" 521; a <windows> element 530 specifies that Bob's house has two windows 531, 532; and a <furniture> element 540 lists furniture associated with Bob's house. In particular, the <furniture> element 540 further comprises child elements that identify the particular sofa, table, and chairs in this house. Attributes in domain model specification 500 specify details of these various features of Bob's house (such as the material from which Bob's sofa and table are made; see 541, 542). The <neighbor> element 550 identifies a neighbor's house (in this example, having an attribute value of "janeHouse"). According to domain model 400 of FIG. 4, element 550 indicates that Bob's house is linked to this identified house. XML document 500 thus contains a second <house> element 560 that specifies further information about this linked house 550.

FIGS. 7 and 8, discussed below, also refer to the house domain model.

Figure 6:
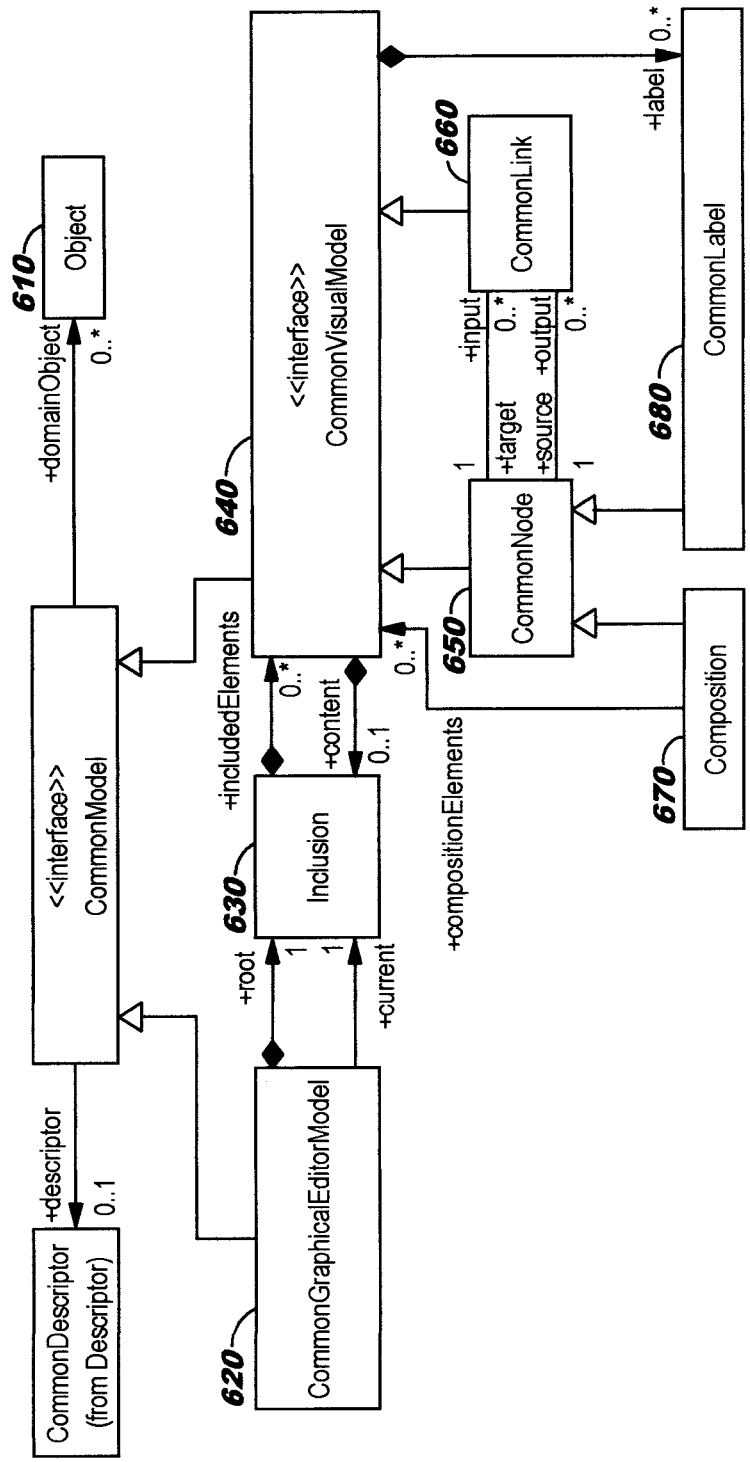
FIG. 6 describes, using UML notation, components of the Common Visual Meta-model used in preferred embodiments.

As noted earlier with reference to FIG. 1, preferred embodiments of the invention use a Common Visual Model 145 which defines the model elements from which graphical editors are composed. FIG. 6 depicts the Common Visual Meta-model. (Refer also to FIG. 7, which is described below, where a sample document according to this meta-model is provided.) As shown in FIG. 6 using a UML diagram, a Common Graphical Editor Model component (see 620) represents the model of all graphical editors. The "Inclusion" element 630 represents the common visual model 640 included in the editor. Inside the Inclusion element, there may be "CommonNode" elements 650, "CommonLink" elements 660, "Composition" elements 670, and "CommonLabel" elements 680. A "domainObject" element 610, representing a particular object from the domain model, can be graphically presented with different figures or images. (A person can be represented using a box or a person-like icon, for example, as discussed earlier.) Conversely, each visual model element can represent different domain model elements. (A box might represent a person, a house, or many other types of domain model elements, for example.)

FIG. 7 provides a sample document 700 that specifies a visual model according to the meta-model in FIG. 6. A <composition> element 710 includes an "id" attribute 712 and a "descriptor" attribute 713, specifying an identifier for a descriptor and the location (by reference to the namespace element 711) of an external file where this descriptor (such as descriptor 800 of FIG. 8, in this example) is stored. As noted in the comments 720, there is no tight coupling between this visual model 700 and the separately-stored descriptor identified at 713. (For example, a different descriptor can be associated with visual model 700 by replacing the value of attribute 713.)

A "domainObject" element 714 includes an "href" attribute 715. As noted in comments 722, the value of attribute 715 identifies the location of an external file where a domain object specification (such as specification 500 of FIG. 5, in this example) is stored. Comments 722 further note that there is no tight coupling between this visual model 700 and the separately-stored domain object identified at 715. (For example, a different domain object can be associated with visual model 700 by replacing the value of attribute 715.)

The <compositionElements> element 730 includes <commonNode> elements 732, 736, and 740. Each of these node elements specifies details for nodes that may be visually represented using a graphical editor created according to document 700. Element 732, for example, specifies information for a door, referring to an externally-stored descriptor (see 733) for this door and identifying (see 734) where the domain object specification for this particular door (within the house identified at 715, in this example) is stored. Similarly, elements 736 and 740 specify information pertaining to two windows.

As noted in comments 744, the <includedElements> element within element 750 is a type of visual relationship, as are the <compositionElements> element 730 and the <commonLink> element 770. Comments 744 also note that additional (or different) types of visual relationships might be specified in a particular visual model.

The <content> element 750 further contains child elements pertaining to nodes (i.e., <commonNode> elements). In this example, the information for each node comprises a reference to a descriptor for that node (see, for example, 752) and a reference to a domain object for that node (see, for example 753), where the domain objects are elements of the furniture in the particular house identified at 715. Note that the specification of doors, windows, and furniture in FIG. 7 corresponds to the visual representation of the sample house shown in FIG. 3.

The <composition> element 760 is similar to element 710, and in this example, specifies similar information for the linked or referenced house (e.g., where to find a descriptor, 761, and where to find a domain object, 762, for this referenced house). The <commonLink> element 770 then specifies attributes of a visual reference that serves to graphically link the two houses "house1" and "house2" according to the "neighborLink1" relationship.

In order to cope with an incremental development process, another component of preferred embodiments is the Visual Model Descriptors (represented at 105 in FIG. 1). XML documents are preferably used for documenting these Visual Model Descriptors. A visual model descriptor holds specific properties of visual model element 181 such as the domain model element type 182, the type of FIG. 184 to use for that domain model element, the icon 185, its edit part 186 (i.e., its behaviors), and its constraints 183. (All model elements may have constraints that are applicable to them.) Referring now to FIG. 8, an example of a Visual Model Descriptor 800 for the house scenario is provided, as will now be discussed.

Element 810 specifies a <compositionDescriptor> for the house domain model. Attribute 811 identifies the domain model element type as being "houseDescriptor" (intuitively indicating that this is a visual descriptor for a "house" domain object). Attribute 812 specifies that the edit part with which the graphical representation of this domain object can be edited is named "houseEditPart" (i.e., the class name for this edit part is "com.ibm.sample.houseEditPart"), and attribute 813 specifies that the graphical figure to be used for visually depicting this domain object is named "rectangleFigure" (i.e., the class name for this figure is "com.ibm.btools.rectangleFigure").

A child element of the <compositionDescriptor> 810 is <compositionContraints> element 815, which specifies the composition type relationships available for the visual model of this object. In this example, element 815 specifies that the house object can have composition type relationships with visual models which are graphically represented as door images and window images. The individual <compositionConstraint> elements within element 815 further specify a maximum number of each of these elements using a "cardinality" attribute. According to this example, doors and windows can thus be associated with a house, and the number of doors is limited (by the cardinality attribute) to 2, while the number of windows is limited to 10.

Another child element of the <compositionDescriptor> 810 is <inclusionConstraints> element 817. In this example, element 817 specifies that the house object can have inclusion type relationships with visual elements which are graphically represented as bed images, chair images, desk images, sofa images, and table images.

The final child element of the <compositionDescriptor> element 810, in this example, is the <inputConstraints> element 819. According to this example, the maximum number of houses that can be referenced, using link relationships, from a particular house is 4.

Next, <commonNodeDescriptor> elements 820, 830, 840, 850, 860, 870, 880 specify each of the node descriptors that were previously referenced (using the "part Id" attribute) at 815 and 817, and further specify the edit part to be used with each of these nodes and the figure that will represent each node when depicted on the UI. For example, element 820 specifies that a door node is to be edited with a "doorEditPart" (i.e., the class name for this edit part is "com.ibm.sample.doorEditPart") and that a "doorFigure" graphic will be used to visually depict a door (i.e., the class name for this figure is "com.ibm.sample.doorFigure").

A <commonLinkDescriptor> element 890 then specifies which node elements can be linked to a house node (at <permissionConstraints> 891), and which cannot (at <prohibitionConstraints> 892). Thus, in this example, a house node can be linked to nodes for other houses (see 891), but not to nodes for doors, windows, beds, chairs, desks, sofas, or tables (see 892).

Figure 9:
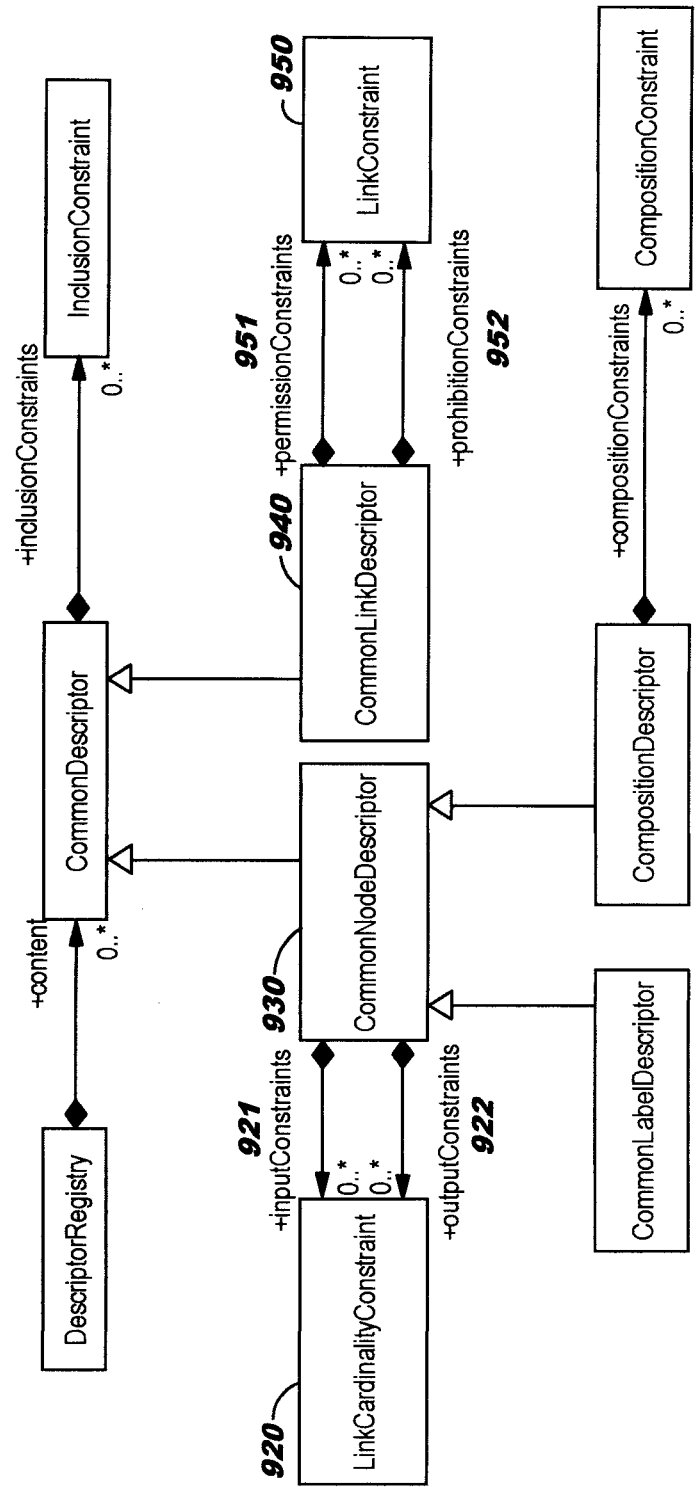
FIG. 9 depicts, in UML notation, the Visual Model Descriptor Meta-model exemplified by FIG. 8.

FIG. 9 depicts, in UML notation, the Visual Model Descriptor Meta-model exemplified by FIG. 8. This figure indicates, for example, that the descriptor element for a node, "CommonNodeDescriptor" 930, is related by a one-to-many relationship to "LinkCardinalityConstraint" elements 920 that may be input 921 or output 922 constraints (i.e., "inputConstraints" or "outputConstraints" elements). This is illustrated in the sample descriptor of FIG. 8 at 819, where input constraints are specified for the house node identified at element 810. As another example, FIG. 9 also indicates that the descriptor element for a link, "CommonLinkDescriptor" 940, may have child elements that are "permissionConstraints" 951 or "prohibitionConstraints" 952 elements. This is illustrated in the sample descriptor of FIG. 8 at link description 890 and its child permission constraints element 891 and prohibition constraints element 892.

According to preferred embodiments, a visual model descriptor (such as that shown at 800 in FIG. 8) is registered by a descriptor registry (as mentioned earlier with reference to 105, 106, 110 of FIG. 1) and read into the common graphical editor 135 at the time the editor 135 starts. The loose coupling between the visual model element properties and the visual model elements facilitates the reuse of the visual representation information, like icons and figure classes, and the editing properties like control classes and constraints. The descriptor registry 110 provides the flexibility of configuring the editing behaviors of an editor 135 by externally updating the visual model descriptor file 105 and the editor layout (such as background color, palette content, etc.) of an editor by externally updating the graphical editor descriptor file 115, without affecting the program code itself.

A visual model descriptor such as descriptor 800 can (optionally) specify the type of the domain models that is represented by the common visual model. (Because of the loose coupling that is possible between domain and visual models, usually it is not necessary for visual model descriptors to identify a particular type of domain model.) One type of visual model can be used to represent different types of domain objects. For example, a common node model can be used to represent an employee with the person's photo, or used to represent a company with the company's logo. In terms of graphical editing, both the employee instances and the company instance interface the same way with the editor (e.g., by enabling a user to drag and drop the employee photos as well as the company logo). By configuring the descriptors, the two instances can have different editing behaviors. For example, a descriptor may specify that one-to-many links can be established from the instance representing the company to the instances representing employees, while the employee instances might be limited to one-to-one references to the company instance. Thus, the editor may prevent a user from associating a particular employee photo with more than one company logo while allowing the company logo to be linked to multiple employee photos.

Figure 10:
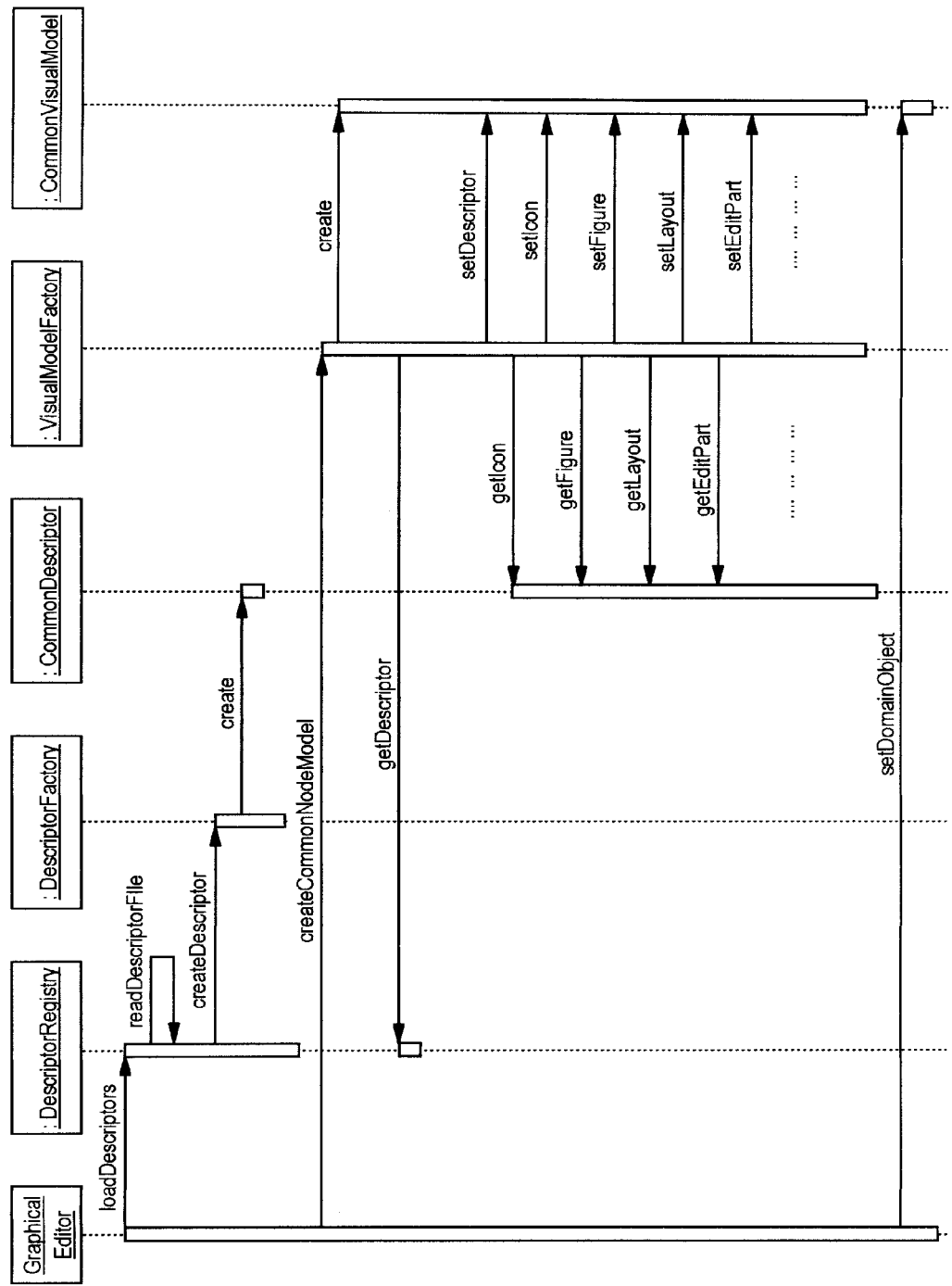
FIG. 10 shows a sequence diagram of creating visual model elements, according to preferred embodiments.

Referring now to FIG. 10, a sequence diagram illustrates how visual model elements may be created according to preferred embodiments. (Reference numbers are provided, when describing FIG. 10, to the corresponding components in FIG. 1. Note that the term "Visual Model Descriptor" is used herein to refer to the collection of all descriptors used for visual models. "CommonDescriptor", shown in the heading of FIG. 10, is one type of these descriptors. "DescriptorFactory" and "VisualModelFactory" in the heading of FIG. 10 refer to utilities for object instance creation. In preferred embodiments, these utilities perform a number of routine object creation tasks, such as inserting creation timestamps, validating that there are no duplicate identifiers, and so forth.)

A Common Graphical Editor Factory 130 is responsible for creating a Common Graphical Editor 135. When a Common Visual Model descriptor 140 is read by a graphical editor application, this Common Visual Model descriptor is passed to the Common Graphical Editor Factory 130. By reference to the header information of the Common Visual Model descriptor, the Factory locates the path of the structural file 105 of the Visual Model Descriptor. (See, for example, the header information specified at 711 and 713 in FIG. 7, which references the descriptor 810 in FIG. 8.) Using this information, the Factory then creates an instance 125 of the Visual Model Descriptor. The Factory also creates the Common Graphical Editor instance 135. The Factory then passes the Visual Model Descriptor 125, Common Visual Model 145, and the Graphical Editor Descriptor 115 (which is the configuration information of the Editor) to the Common Graphical Editor 135.

In preferred embodiments, Common Graphical Editor 135 is a default editor which is designed to accommodate the concepts of Common Visual Model 145 and Visual Model Descriptor 125. A Common Graphical Editor is created and instantiated by Common Graphical Editor Factory with the Graphical Editor Descriptor, as is Visual Model Descriptor which can be seen as a meta-model of the Common Visual Model. (Refer also to Block 230 of FIG. 2, where this was discussed briefly.)

Note that associating the visual model with a domain object can be the final step in this process, as shown by "setDomainObject" at the bottom of FIG. 10.

Descriptor Registry 110 is a registry for Visual Model Descriptor 105 and Graphical Editor Descriptor 115. In preferred embodiments, the registry comprises a data structure (such as a table) which maps a specific key to the path of the Visual Model Descriptor and the path of Graphical Editor Descriptor. For example, an entry in this data structure may be structured as shown by this sample triplet:

(Key_Value, Visual_Model_Descriptor_path, Graphical_Editor Descriptor_path)

A unique value for this key can be constructed in a number of ways, including based on a unique file name or a unique file extension, without deviating from the scope of the present invention.

Figure 11A:
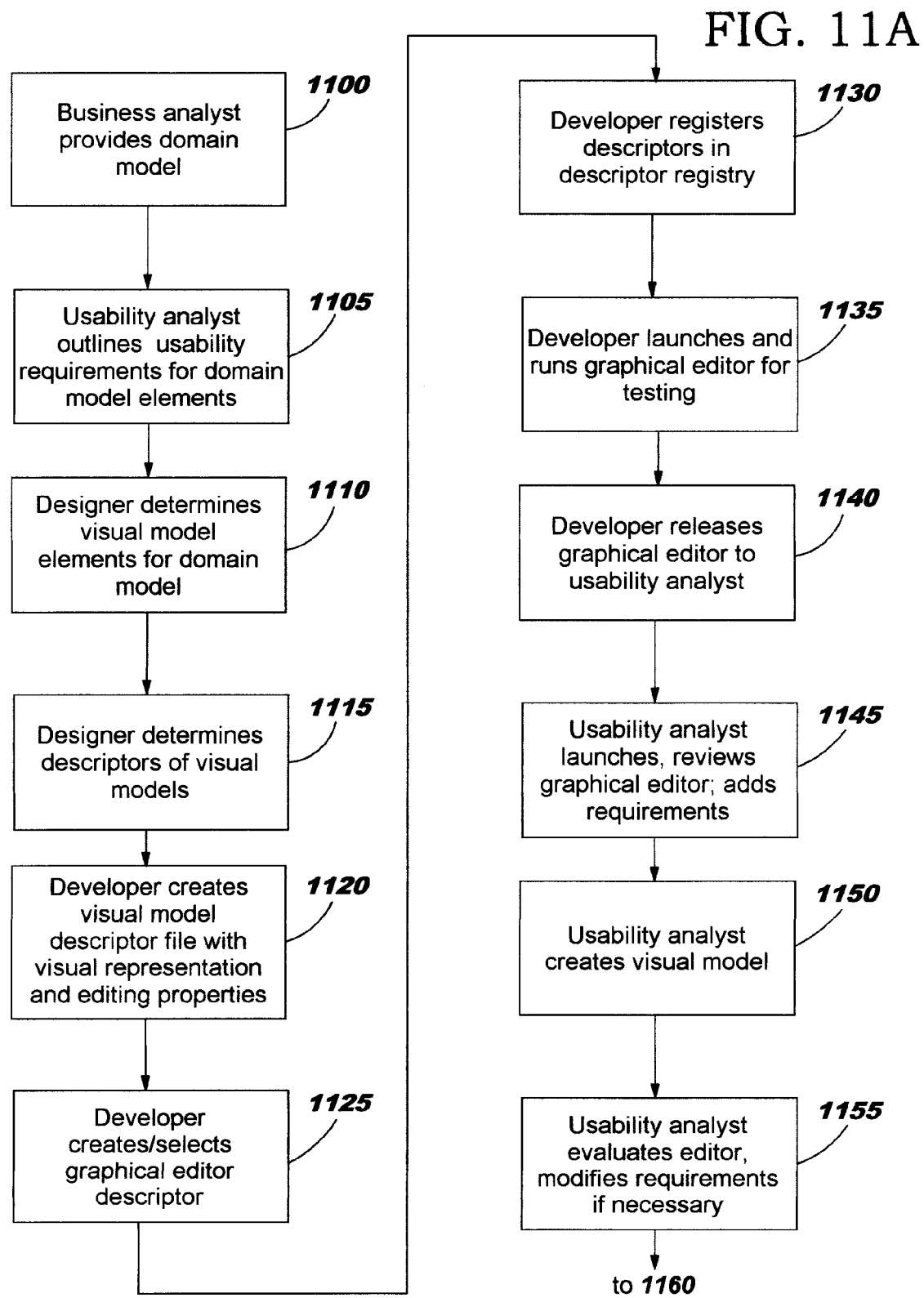
FIG. 11 (comprising FIGS. 11A and 11B) depicts a flowchart that shows a sample scenario of using a preferred embodiment of the invention.
Figure 11B:
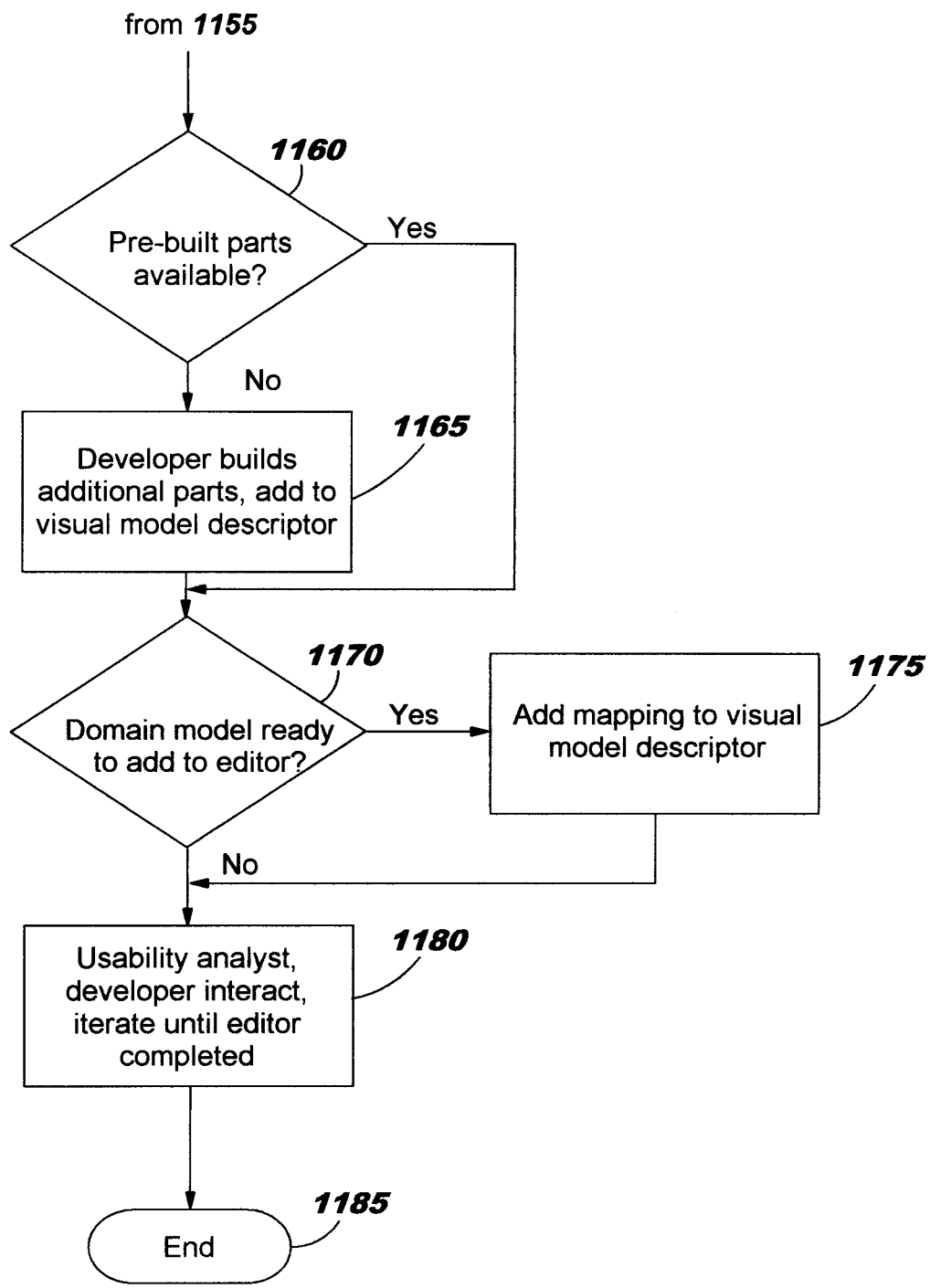

Referring now to FIG. 11, a flowchart is provided showing a sample scenario of using a preferred embodiment of the invention. As shown therein, a business analyst provides a domain model on which the graphical editor will be based (Block 1100). A usability analyst outlines the usability requirements for the elements of this domain model (Block 1105). Note that because of the loose coupling between domain model and visual model, Blocks 1100 and 1105 may be iterative processes that may overlap in time.

While these analysts are refining the domain objects and requirements, a designer determines the visual model elements corresponding to the domain model elements (Block 1110), based on the tooling requirements, and designs the descriptors for the visual models in light of the usability requirements (Block 1115). A developer then creates the visual model descriptor file, defining the visual representation and editing properties for each descriptor, based on the requirements (Block 1120). In the first milestone, the developer may use existing pre-built parts to build the descriptor. The developer also creates a Graphical Editor Descriptor (Block 1125) or may alternatively use a pre-built, default Graphical Editor Descriptor that may be supplied with the Common Graphical Editor System.

At Block 1130, the developer registers the descriptors to the Descriptor Registry. Next, the developer launches and runs the graphical editor for testing, thus completing the first milestone (Block 1135). The developer then releases the graphical editor to the usability analyst, looking for feedback (Block 1140). The usability analyst launches and reviews the graphical editor (Block 1145), and adds new requirements if necessary. Now the usability analyst is able to create the content of the visual model object (Block 1150). Using this visual model, the usability analyst is able to touch and feel the editor and modify requirements if necessary (Block 1155).

Block 1160 tests to see if the pre-built parts meet the requirements (including whether a required behavior is not supported by the pre-built parts). If not, then at Block 1165, the developer uses a graphical application framework (for example, GEF) to build the necessary parts and incorporates those parts into the visual model descriptor. (GEF may be used as a foundation framework for implementing embodiments of the present invention, if desired.) For example, if the pre-built parts do not contain any figures deemed suitable for representing sofas in a house, a new part may be created and identified in node descriptor 870 of FIG. 8.

Block 1170 tests to see if the domain model is ready to incorporate into the visual model. If so, then at Block 1175, the developer incorporates the mapping of the domain model into the visual model descriptor. (In preferred embodiments, this mapping comprises the descriptor that specifies the class names of the edit parts, figures, and domain model; the file name of the icons; and so forth. See, for example, 810, 820, etc. in FIG. 8.) The usability analyst may then perform additional testing with the editor to further refine requirements. As indicated at Block 1180, the usability analyst and the editor developer interact with each other until the requirements are fulfilled and the editor is therefore considered complete. The process of FIG. 11 then ends (Block 1185).

As will be appreciated by one of skill in the art, embodiments of the present invention may be provided as (for example) methods, systems, and/or computer program products. The present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

The invention claimed is:

1. A computer-implemented method for enabling incremental development of a graphical editor for editing objects of a domain model using a visual model, the method comprising:
   executing an editor engine component that initially creates the graphical editor for editing the objects of the domain model using the visual model, further comprising:
      processing, by the editor engine component, a visual model structural file to obtain a definition specified therein of the visual model, an identification of a visual model descriptor file referenced in the definition, and an identification of a domain model structural file referenced in the definition, the domain model structural file defining the objects of the domain model; and
      processing, by the editor engine component, the identified visual model descriptor file to obtain a definition specified therein of constraints on the visual model, thereby configuring behavior to be exhibited by the created graphical editor for editing the objects defined in the domain model structural file; and
   subsequently changing at least one of the identification of the visual model descriptor file referenced in the definition and the identification of the domain model structural file referenced in the definition, wherein the subsequent change thereby causes the created graphical editor to exhibit different behaviors for editing the objects defined in the domain model structural file or to edit objects defined in a different domain model structural file, respectively.

2. The method according to claim 1, wherein the visual model descriptor file further specifies a definition of at least one property of at least one visual element that is renderable with the graphical editor, and wherein responsive to modifying the definition of a particular one of the at least one property of a selected one of the at least one visual element in the visual model descriptor file, the processing of the visual model descriptor file by the editor engine component causes the rendering of the selected visual element to change according to the particular modified property.

3. The method according to claim 1, wherein the constraints specified in the visual model descriptor file provide bounds for allowable operations in the visual model when using the graphical editor for editing the objects of the domain model.

4. The method according to claim 1, wherein the specified constraints comprise permitted behaviors of elements of the visual model.

5. The method according to claim 1, wherein the identified visual model descriptor file further specifies, for each of a plurality of domain model elements of the domain model, a reference to a stored graphical figure to be used for representing the domain model element in the graphical editor.

6. The method according to claim 1, wherein the identified visual model descriptor file further specifies, for each of a plurality of domain model elements of the domain model, a reference to stored program logic that provides editing behavior for editing the domain model element in the graphical editor, and wherein the editor engine component is adapted for changing the editing behavior for editing the domain model elements by processing a different visual model descriptor file.

* * * * *